United States Patent [19]
Li et al.

[11] Patent Number: 5,925,965
[45] Date of Patent: *Jul. 20, 1999

[54] AXIAL FLUX RELUCTANCE MACHINE WITH TWO STATORS DRIVING A ROTOR

[75] Inventors: Yue Li, St. Louis; Jerry D. Lloyd, Florissant, both of Mo.

[73] Assignee: Emerson Electric Co., St. Louis, Mo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/709,105

[22] Filed: Sep. 6, 1996

[51] Int. Cl.$^6$ .......................... H02K 37/02; H02K 37/08
[52] U.S. Cl. .................. 310/268; 310/112; 310/49 R; 310/166; 310/168; 318/701; 318/696
[58] Field of Search ................................ 310/112, 49 R, 310/162, 168, 166, 177, 179, 180, 184, 185, 188, 261, 266, 268, 269, 51; 318/701, 696, 685

[56] References Cited

U.S. PATENT DOCUMENTS

| | | | |
|---|---|---|---|
| 4,035,680 | 7/1977 | Maeder | 310/168 |
| 4,187,441 | 2/1980 | Oney | 310/112 |
| 4,363,988 | 12/1982 | Kliman | 310/268 |
| 4,794,286 | 12/1988 | Taenzer | 310/12 |
| 4,945,268 | 7/1990 | Nihei et al. | 310/12 |
| 5,168,190 | 12/1992 | Bahn | 310/166 |
| 5,459,385 | 10/1995 | Lipo et al. | 318/701 |

OTHER PUBLICATIONS

L. E. Unnewehr, et al., "An Axial Air–Gap Motor for Variable Speed Applications," Jan./Feb. 1974, IEEE Transactions on Power Apparatus and Systems.

M. A. El–Khazendar, et al., "An Axial Field Switched Reluctance Disc Motor," Sep. 12–14, 1988, Proc ICEM 88 Conference, vol. 2, Pisa, Italy.
M. A. El–Khazendar, et al., "Running Performance of a Switched Reluctance Disc Motor," Sep. 12–14, 1988, Proc ICEM 88 Conference, vol. 2, Pisa, Italy.
D. Matt, et al., "Study of Original Structures of Multi–Airgap Reluctance Machines," Sep. 12–14, 1988, Proc ICEM 88 Conference, vol. 3, Pisa, Italy.
M. A. El–Khazendar, "An Improved Disc–Geometry Switched Reluctance Motor," Sep. 15–17, 1992, Proc ICEM 92, vol. 2, Machester, United Kingdom.
U. S. Deshpande, et al., "High–Force Density Linear Switched Reluctance Machine," Mar./Apr. 1995, IEEE Transactions on Industry Applications, vol. 31 No. 2.
C. Pollock, et al., "An Integrated Approach to Switched Reluctance Motor Design," Sep., 1987, Proc of EPE Conference, Grenoble, Switzerland.
Xiaogang Luo et al, "A Novel Two–Phase Doubly Salient Permanent Magnet Motor," 1996 Wempack Consortium.
Stephenson and Blake, "The Characteristics, Design and Applications of Switched Reluctance Motors and Drives," Jun. 1993, Nuremberg, Germany.

*Primary Examiner*—Nestor Ramirez
*Assistant Examiner*—Karl Tamai
*Attorney, Agent, or Firm*—Arnold, White & Durkee

[57] ABSTRACT

An axial flux reluctance machine including a rotor formed from a wound tape of paramagnetic material, a first stator formed from a wound tape of paramagnetic material and a similarly constructed second stator, where the first and the second stators define stator poles and wherein the stator poles of the first stator are not completely aligned with the stator poles of the second stator. Also a reluctance machine system for energizing the axial flux reluctance machine and methods for forming the wound tape rotor and stators.

13 Claims, 13 Drawing Sheets

AXIAL FLUX RELUCTANCE MACHINE WITH TWO STATORS DRIVING A ROTOR

FIELD OF THE INVENTION

The invention relates to reluctance machines and, in particular, to axial flux reluctance machines.

BACKGROUND OF THE INVENTION

Reluctance machines are well known in the art. In general a reluctance machine is an electric machine in which torque is produced by the tendency of a movable part to move to a position where the inductance of an excited winding is maximized (i.e. the reluctance is minimized).

In one type of reluctance machine the phase windings are energized at a controlled frequency. This type of reluctance machine is generally referred to as a synchronous reluctance machine. In another type of reluctance machine, circuitry is provided to determine the position of the machine's rotor, and the windings of a phase are energized as a function of rotor position. This type of reluctance machine is generally referred to as a switched reluctance machine. Although the description of the current invention is in the context of a switched reluctance machine, the present invention is applicable to all forms of reluctance machines, including synchronous and switched reluctance motors and to other machines that have phase winding arrangements similar to those of switched reluctance machines.

The general theory of design and operation of switched reluctance machines is well known and discussed, for example in The Characteristics, Design and Applications of Switched Reluctance Motors and Drives, by Stephenson and Blake and presented at the PCIM '93 Conference and Exhibition at Nuremberg, Germany, Jun. 21–24, 1993.

In general, reluctance machines have been designed with a stator yoke having inward projecting salient poles and a hollow core area. Nested concentricity in the hollow core area, or stator bore, is a rotor having outwardly projecting salient poles. Typically, the rotor contains no circuitry or permanent magnets. The rotor and the stator are coaxial. The rotor is connected to a rotor shaft which is free to rotate and acts as an output shaft when the machine is motoring, and as an input shaft when the machine is generating.

Associated with each stator pole is a coil of wire wound around the pole. The stator poles which are positioned opposite one another are generally coupled to form a single phase. A phase is energized by delivering current to the coil. Switching devices are generally provided which allow the coil to be alternately connected into a circuit which delivers current to the coil when the phase is energized and one which separates the coil from a current source when the phase is de-energized, and which may recover energy remaining in the winding.

Reluctance torque is developed in a reluctance machine by energizing a pair of stator poles when a pair of rotor poles is in a position of misalignment with the energized stator poles. The degree of misalignment between the stator poles and the rotor poles is called the phase angle. Energizing a pair of stator poles creates a magnetic north and south in the stator pole pair. Because the pair of rotor poles is misaligned with the energized stator poles by some phase angle, the inductance of the stator and rotor is less than maximum. The pair of rotor poles will tend to move to a position of maximum inductance with the energized windings. The position of maximum inductance occurs where the rotor and stator poles are aligned.

At a certain phase angle in the rotation of the rotor poles to the position of maximum inductance, but before the position of maximum inductance is achieved, the current is removed from the phase de-energizing the stator poles. Subsequently, or simultaneously, a second phase is energized, creating a new magnetic north and south pole in a second pair of stator poles. If the second phase is energized when the inductance between the second pair of stator poles and the rotor poles is increasing, positive torque is maintained and the rotation continues. Continuous rotation is developed by energizing and de-energizing the stator poles in this fashion. The total torque of an reluctance machine is the sum of the individual torques described above.

One problem associated with reluctance machines is that the torque developed by the machine is not smooth. Torque drops off steeply when the phase angle of the rotor is between the poles of the stator, when the inductance is minimized, then increases as the phase angle of the rotor moves toward alignment with a stator pole, when inductance is maximized. This rising and falling torque phenomenon is known as "torque ripple."

In the past the problem of torque ripple has sometimes been addressed by modifying the motor control circuitry. As one example, by profiling the current in a phase during the active time period when the phase is energized, the rate of change in the magnetic flux can be controlled resulting in less abrupt changes in machine torque. This approach requires complex circuitry, and therefore results in higher design, manufacturing, and maintenance costs.

In addition to the problem of torque ripple, known reluctance machines often produce undesirable noise and vibration. As the inductance of a reluctance machine increases and decreases, the magnetic flux in parts of the machine changes in relation to the increasing and decreasing inductance. As a typical reluctance machine's pair of rotor poles moves into a position of alignment with a pair of stator poles, lines of magnetic flux deform the shape of the rotor and stator poles, decreasing the separation space between the poles. The changing flux results in fluctuating magnetic forces being applied to the ferromagnetic parts of the machine. These forces can produce unwanted noise and vibration. One major mechanism by which these forces can create noise is the ovalizing of the stator caused by magnetic forces normal to the air-gap. Generally, as the magnetic flux increases along a given diameter of the stator, the stator is pulled into an oval shape by the magnetic forces. As the magnetic flux decreases, the stator pulls or springs back to its undistorted shape. This ovalizing and springing back of the stator will produce audible noise and can cause unwanted vibration.

Another problem associated with some reluctance machines is high core losses. When the phase windings of a reluctance machine are energized and de-energized, the magnetic field flux varies. The result of the variations is a loss of energy in the iron core of the machine. These core losses consist of eddy-current losses and hysteresis losses. As the rate the phases are energized and de-energized increases per unit of time (the commutation frequency) the hysteresis portion of the core losses increases proportionately, and the eddy-current losses increase proportionately to the square of the commutation frequency. Because many reluctance machines require relatively high commutation frequencies, the core losses can be significant as the magnet flux in a given magnet core varies at a rate proportional to the commutation frequency.

The above mentioned difficulties and limitations are common to most all known reluctance machine including those machines having a flux paths that are "radial" (i.e., generally perpendicular to the rotor's axis of rotation) and those machines having "axial" flux paths (i.e., flux paths that are generally parallel to the rotational axis of the rotor). In addition to suffering from the shortcomings described above, known axial flux reluctance machines are further limited in other respects.

FIGS. 1A and 1B illustrate a conventional axial flux machine 10 including a disc-shaped rotor 11 defining two rotor poles 11a and 11b and a stator 12 having two stators 12a and 12b defining three U-shaped stator poles 12a, 12b and 12c. FIG. 1A illustrates a side view of this conventional machine while FIG. 1B illustrates the cross-section of the rotor 11 and one of the stators. As illustrated, opposing stator teeth from the two stators are aligned such that all of the torque is produced as a function of the self-inductance of the phase windings and such that the only significant torque producing flux paths extend from one of the stators, through the active rotor material to and through the other stator.

Conventional disc-type axial flux reluctance machines having U-shaped poles such as the one illustrated in FIGS. 1A and 1B suffer from the previously described shortcomings, but suffer more acutely from high core losses as the flux flowing through the stator poles is the same as the flux flowing through the stator yoke. This is clearly reflected by FIG. 1B where the extensive length of each stator pole is shown and the flux path extends through the stator pole and the stator yoke. Thus, because all of the pole flux passes through the stator yoke, the stator yokes of such machines must be relatively large to maintain reasonable flux densities.

In addition to suffering high core losses, conventional axial flux reluctance machines, like machine 10, are limited in that they are often difficult to construct and are limited to low torque applications. The construction difficulties arise from the fact that the rotor must comprise both paramagnetic portions formed from, e.g., iron or steel 11a and 11b (to carry magnetic flux) and non-paramagnetic separating material 14 to separate the flux carrying portions of the rotor. This non-magnetic separating material 14 is required to set up the torque-producing flux paths necessary for proper operation of such conventional machines. The construction of such a two-material rotor is often complex and expensive. Moreover, because only a portion of the rotor contains active torque-producing material, the torque output of such a machine is typically far less than would be desired for a rotor of a given size. The above described difficulties are also associated with the stators of conventional axial flux reluctance machines which are often constructed from both paramagnetic and non-paramagnetic materials.

It is an object of the present invention to overcome these and other limitations of the prior art by, among other things, providing an axial flux reluctance machine and a method of operating a reluctance machine whose torque ripple, noise, vibration, and core loss characteristics are better than those available from known reluctance machines and operating methods.

SUMMARY OF THE INVENTION

The present invention concerns an axial flux reluctance machine and methods for operating such a machine to reduce torque ripple, noise, vibration, and core losses and to improve the overall characteristics of such a reluctance machine.

One aspect of the present invention relates to an axial flux reluctance machine that includes a rotor arranged to rotate about an axis, where the rotor defines a number of rotor poles that project in a direction substantially parallel to the axis of rotation and a stator positioned adjacent to the rotor, where the stator defines a number of stator poles that project substantially in a direction parallel to the axis of rotation and wherein the stator is formed from a wound tape of paramagnetic material. An other aspect of the present invention is a similar axial flux reluctance machine where the rotor is formed from a wound tape of paramagnetic material.

A further aspect of the present invention relates to a method of forming a rotor or a stator for an axial flux reluctance machine where the method comprises the steps of forming a tape of paramagnetic material where the tape defines a central core and a number of outwardly projecting rotor pole portions and where the tape is wound about a central member such that a number of projecting rotor pole portions overlay one another to create a wound tape rotor.

A still further aspect of the present invention relates to an axial flux reluctance machine that includes a rotor arranged to rotate about a central axis where the rotor comprising a central yoke, a first set of rotor poles extending in a first direction that is essentially parallel to the axis of rotation and a second set of rotor poles extending in a second direction that is opposite that of the first direction, a first stator positioned adjacent to the rotor, the first stator defining a number of projecting stator poles that extend in the second direction, the first stator being positioned such that the first stator's projecting stator poles are opposite the first set of rotor poles; and a second stator positioned adjacent to the rotor, the second stator defining a number of projecting stator poles that extend in the first direction, the second stator being positioned such that the second stator's projecting stator poles are opposite the second set of rotor poles and wherein the first stator's stator poles are not completely aligned with the second stator's stator poles. The present invention also relates to a reluctance machine system including the described axial flux reluctance machine.

Other aspects and advantages of the present invention will become apparent upon reading the following detailed description and upon reference to the drawings.

DETAILED DESCRIPTION OF THE INVENTION

Figure 1A:
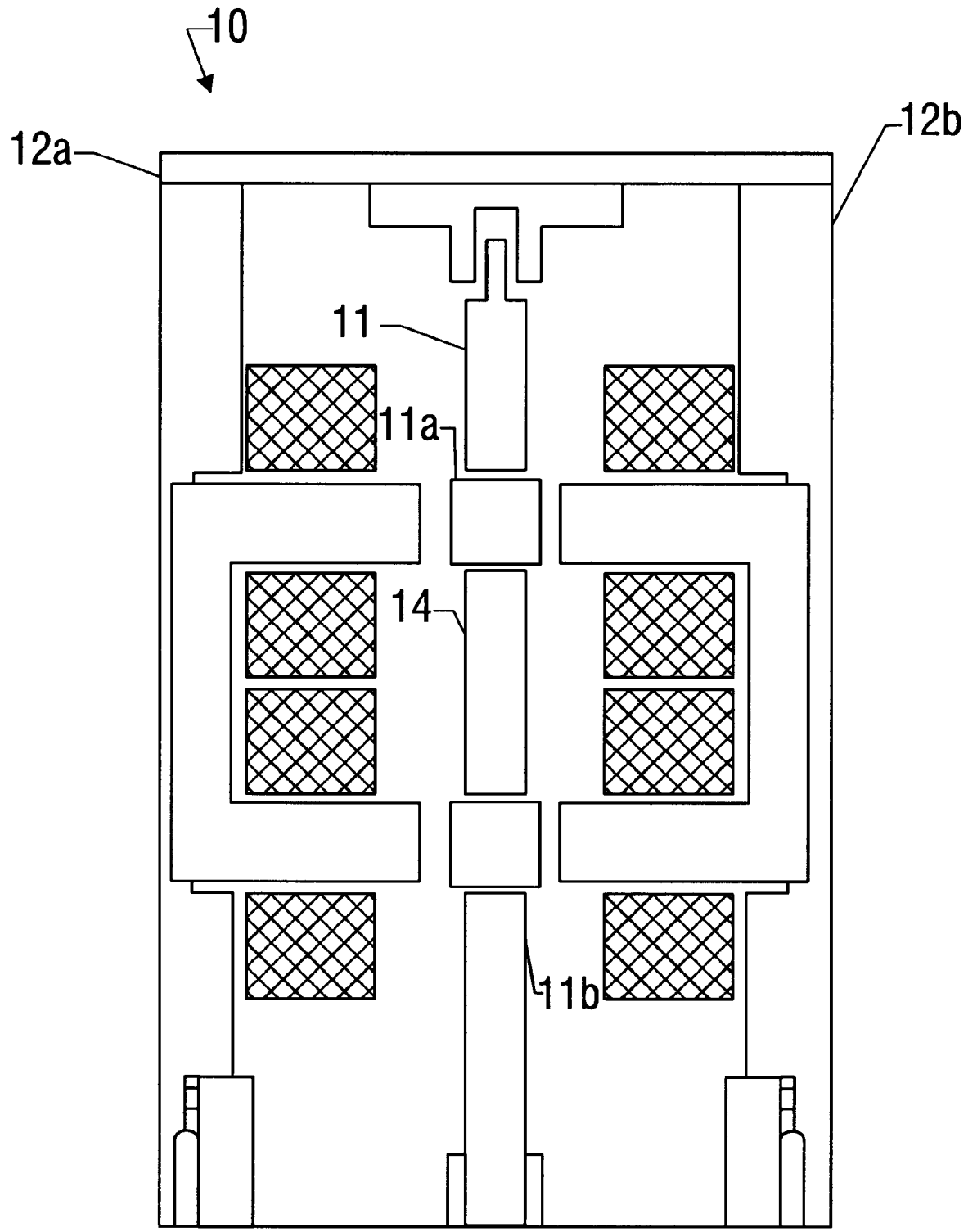
FIGS. 1A and 1B illustrate a typically prior art disc-type axial flux reluctance machine 10.
Figures 1, 1B:
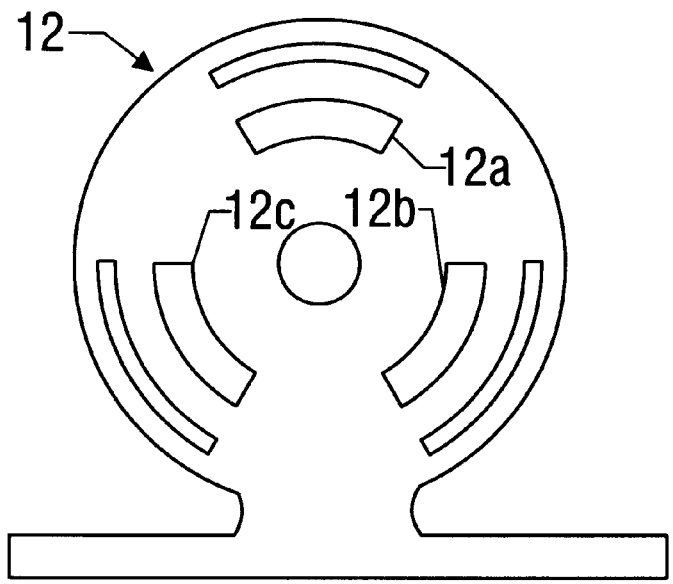
Figures 1, 1B, 2:
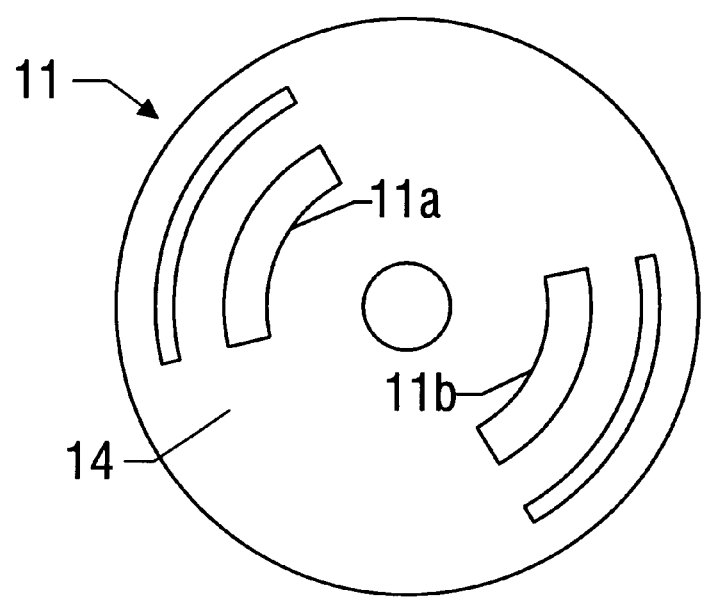
Figure 2A:
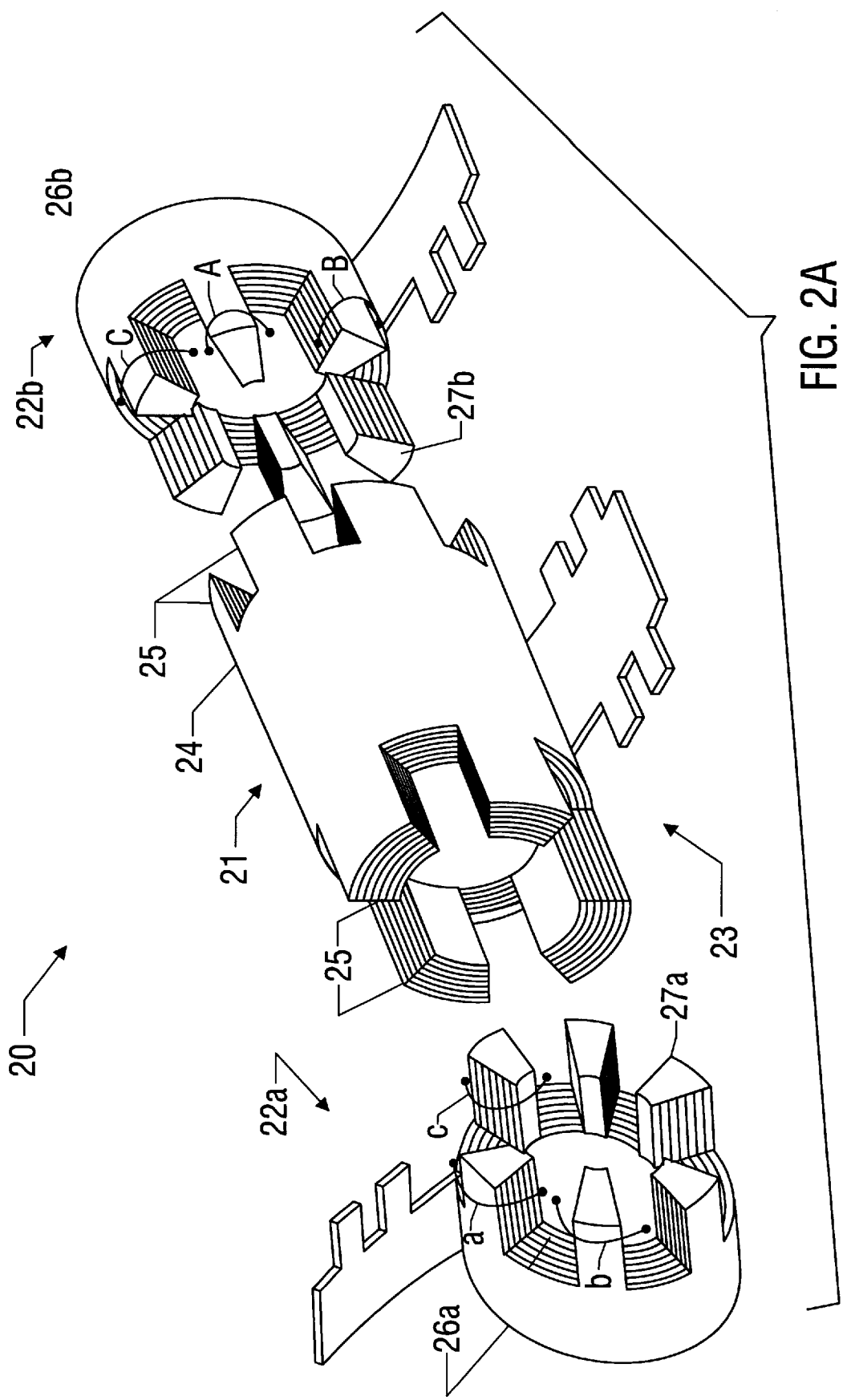
FIGS. 2A and 2B illustrate an axial flux reluctance machine in accordance with the present invention.
Figure 2B:
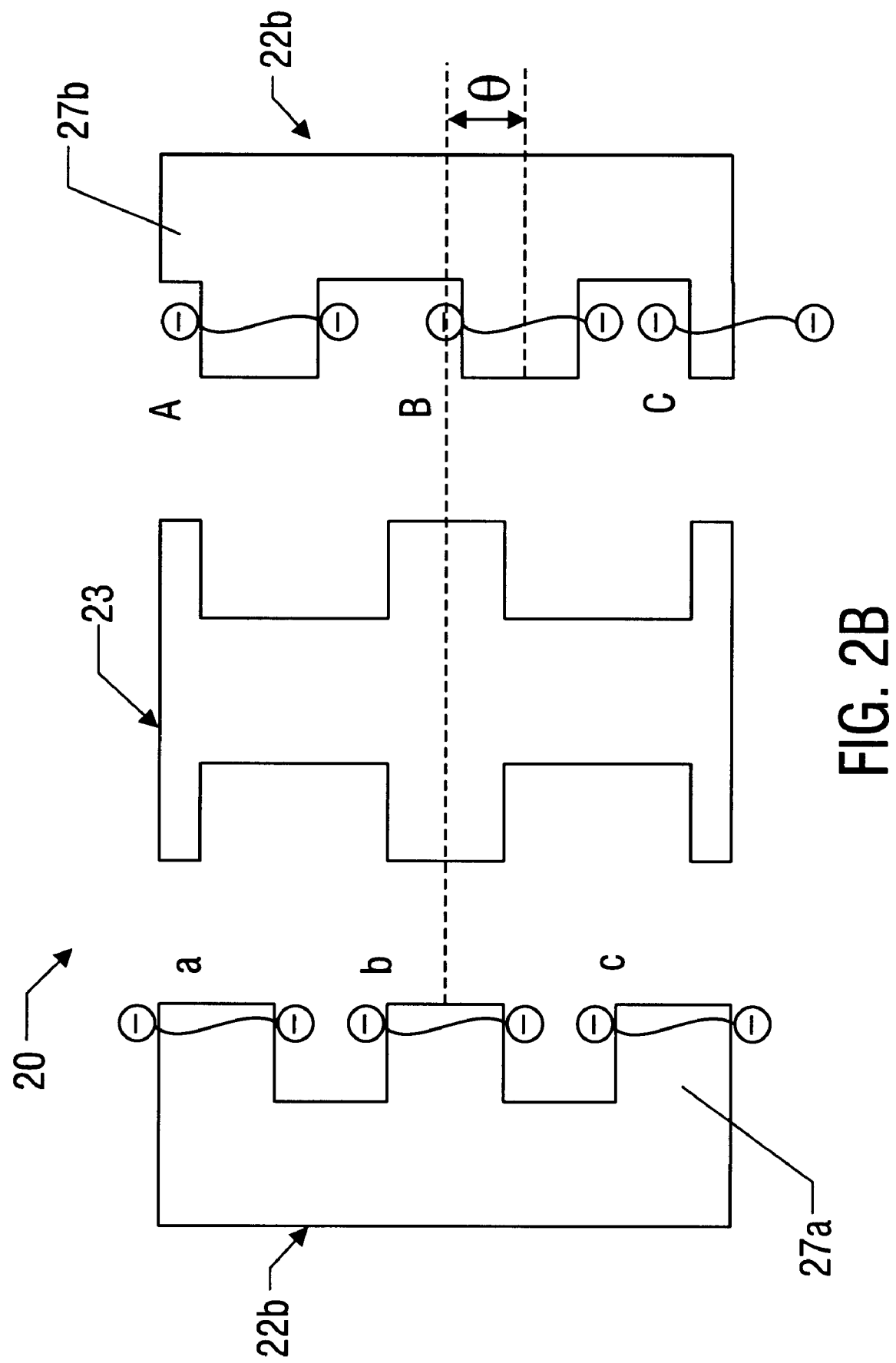

Turning to the drawings and, in particular, to FIGS. 2A and 2B an axial flux reluctance machine 20 in accordance with the present invention is shown. In general, the reluctance machine includes a rotor 21 and first and second stators 22a and 22b.

The rotor 21 is positioned in an interior region 23 defined by the two stators 22a and 22b. The rotor 21 generally comprises a central yoke region 24 and four outwardly extending pole portions 25 which extend perpendicularly from a front and a back face of the rotor, are evenly dispersed around the perimeter of the rotor yoke, and are separated by equal angles $\theta_R$ (the rotor pole pitch). In the embodiment shown in FIGS. 2A and 2B, each face of the rotor has four salient poles separated by a rotor pole pitch of 90 degrees. It will be recognized by those skilled in the art that other embodiments with a greater or lesser number of rotor poles are possible.

Each of the stators 22a and 22b comprises a central yoke region 26a and 26b and six pole portions 27a and 27b that extend into the interior region 23. The poles extend perpendicularly from the face of the respective stator yokes, and are evenly dispersed around the perimeter of the stators 22a and 22b and separated by equal angles $\theta_S$ (the stator pole pitch). In the embodiment shown in FIGS. 2A and 2B, each stator has six salient poles separated by a stator pole pitch of 60 degrees. It will be recognized by those skilled in the art that other embodiments with a greater or lesser number of stator poles are possible The projecting pole portions 27a of the first stator 22a are not in axial alignment with the projecting pole portions 27b of the second stator 22b. Instead, the opposing pole portions are off-set from one another by an angle THETA. This is best illustrated in FIG. 2B. In the exemplary embodiment of FIGS. 2A and 2B, THETA is equal to one-quarter of the angular distance between corresponding points on adjacent on a given stator and is fifteen degrees (mechanical). Thus, for this particular THETA value opposing poles from the first stator portion and the second stator portion are not in complete alignment but instead slightly "overlap" with one another.

It will be appreciated by those of ordinary skill in the art that THETA need not necessarily be one-quarter of the stator pole pitch and that THETA could have any value greater than 0 degrees mechanical up to a full pole pitch without departing from the scope and spirit of the present invention. Embodiments where THETA is equal to one-half of the pole pitch and where there is no overlap between opposing poles of the first and second stator portions are specifically contemplated in this regard.

Three phase windings a, b and c are wound about the projecting poles 27a of the first stator 22a such that each phase winding includes coils wound about two stator poles separated from another by 180 mechanical degrees. These phase windings may be wound in a conventional manner such that two poles along the same polar axis of a single stator form a magnetic north and south when the phase is energized. Phase windings A, B and C are similarly wound about projecting poles 27b of stator 22b. As explained in more detail below, during operation, the phase windings a, b and c and A, B and C are energized to produce a torque on the rotor 21 such that the rotor 21 rotates within interior region 23.

Figure 3A:
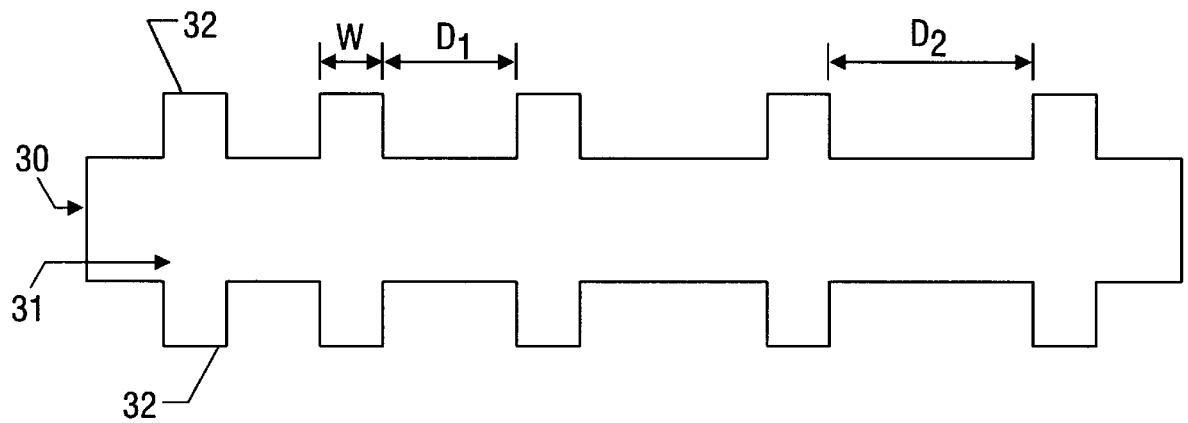
FIGS. 3A and 3B illustrate the construction and the method of construction of the wound tape rotor and stators of the present invention.
Figure 3B:
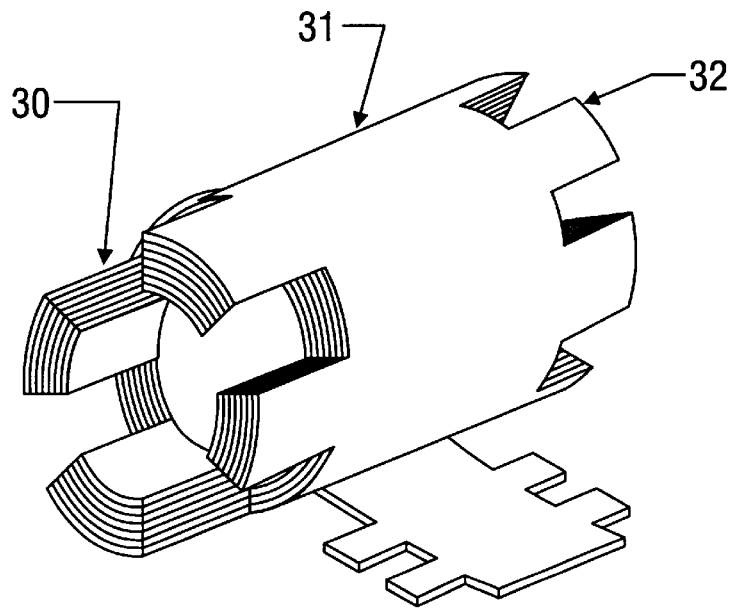

Unlike the rotor assemblies in known reluctance machines, which typically comprises a stack of substantially identical laminations, the rotor 21 of machine 20 is, in the example of FIGS. 2A and 2B, constructed of a wound tape of an appropriate material, such as steel. FIGS. 3A–3B generally illustrates a potion of the tape from which the rotor 21 is formed in the exemplary embodiment.

The construction of machine 20 may be relatively compact since the end turns of the various coils that comprise the phase windings are oriented in a direction substantially perpendicular to the axis of rotation. Accordingly, it is possible to position the first stator portion closely adjacent to the stator portions since the end-turns are not in the way.

Referring to FIGS. 3A and 3B, a tape structure 30 formed of appropriate material (e.g., steel) is formed by machining operations, punching operations, or the like. The tape is formed such that it defines a central yoke portion 31 and opposite aligned extending portions 32. The steel tape is preferably coated with a light insulating material, which may be of the type commonly used to coat standard rotor laminations in radial flux machines. In the exemplary embodiment of FIGS. 3A and 3B, the projecting rotor pole portions are arranged symmetrically such that for each projecting rotor pole portion on one side of the core there is a complementary projecting rotor pole portion extending from the other side of the core although other embodiments are envisioned.

In the example of FIGS. 3A and 3B, the width W of each of the projecting rotor pole portions is the same. For reasons explained in more detail below, the linear distance between D between adjacent rotor pole portions increases from one end of the tape structure (e.g.,. the left end in FIG. 3A) to the other (e.g., the right end) such that D2 is greater than D1.

To construct the rotor 21, the tape structure 30 may be "wound" around a form or, in one contemplated method, affixed to and wound around a shaft such that, after an number of winding steps, a rotor 21 such as that illustrated in FIG. 2A is produced. In such a winding operation, care should be taken to ensure that each projecting rotor pole portion 32 overlays another projecting rotor pole portion such that discrete rotor poles are formed. The increasing linear distance D between projecting rotor pole portions compensates for the fact that as the rotor is "wound" the radius of the wind increases and thus the linear distance between adjacent rotor poles required for pole overlap also increases. This method of construction is generally illustrated in FIG. 3B.

The use of this wound rotor configuration is believed to provide significant advantages both in terms of simplicity and economy of construction and in terms of motor efficiency in the form of reduced eddy currents. It has been determined that, for axial flux reluctance machines, eddy currents tend to be established such that the flow of the eddy currents is in a direction perpendicular to the axis of rotation of the rotor (i.e., the eddy currents tend to be radial). Such eddy currents can dissipate useful energy that could otherwise be saved or used to produce useful torque. Because of the insulating film coating the tape from which the rotor 21 is formed, such radial eddy currents cannot be easily established.

Referring to FIGS. 2A and 2B it may be noted that, in that exemplary illustrated embodiment, the stators 22a and 22b are formed from a "wound tape" in the manner previously described for the rotor 21. The layout of the tape for the stators 22a and 22b will, of course, be different from that illustrated in FIG. 3A for the rotor and will be apparent to one of ordinary skill in the art having the benefit of this disclosure.

Figure 4:
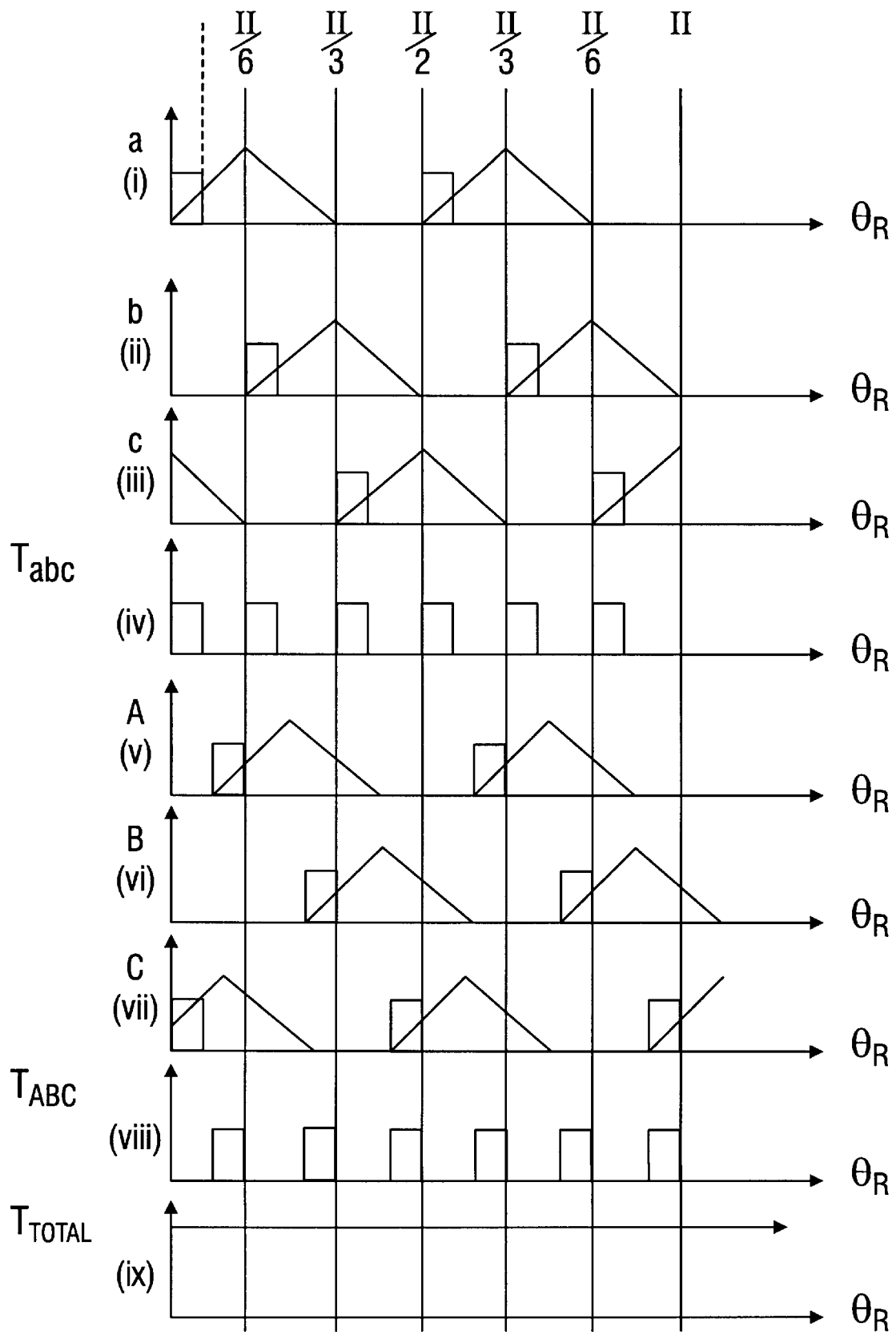
FIG. 4 illustrates an energization scheme for the machine of FIGS. 2A and 2B where only one phase winding is energized at each rotor position.

Through appropriate energization of the phase windings a, b, and c and A, B and C, the machine 20 of FIGS. 2A and 2b may be operated to provide an axial flux reluctance machine with improved operating characteristics. FIG. 4 illustrates an exemplary energization scheme that may be used to excite the machine 20 of FIGS. 2A and 2B at relatively high speeds. The illustrations in FIG. 4 reflect only 180 degrees of rotor rotation. Because of the symmetric nature of the machine 20 the 180–360 waveforms for the 180–380 interval are the same as those provided for the 0–180 degree interval in FIG. 4.

At relatively high rotational speeds, the phase energization currents applied to phase windings a, b, and c and A, B and C may be such that the intervals of active energization of the different phase windings (e.g., the duty cycle of the power switching devices) do not overlap. In this embodiment, the motor operates basically as an axial flux reluctance machine having four rotor poles, twelve rotor poles and six phase windings. FIG. 4 illustrates, from top to bottom: (i)–(iii) the phase inductance and phase energization currents for phases a, b and c; (iv) the net output reluctance torque produced by energization of phases a, b and c; (v)–(vii) the phase inductance and phase energization currents for phases A, B and C; (viii) the net output reluctance torque produced by energization of phases A, B and C; and (ix) the total torque output for the machine 20 when energized according to the energization scheme of FIG. 4.

Figure 5:
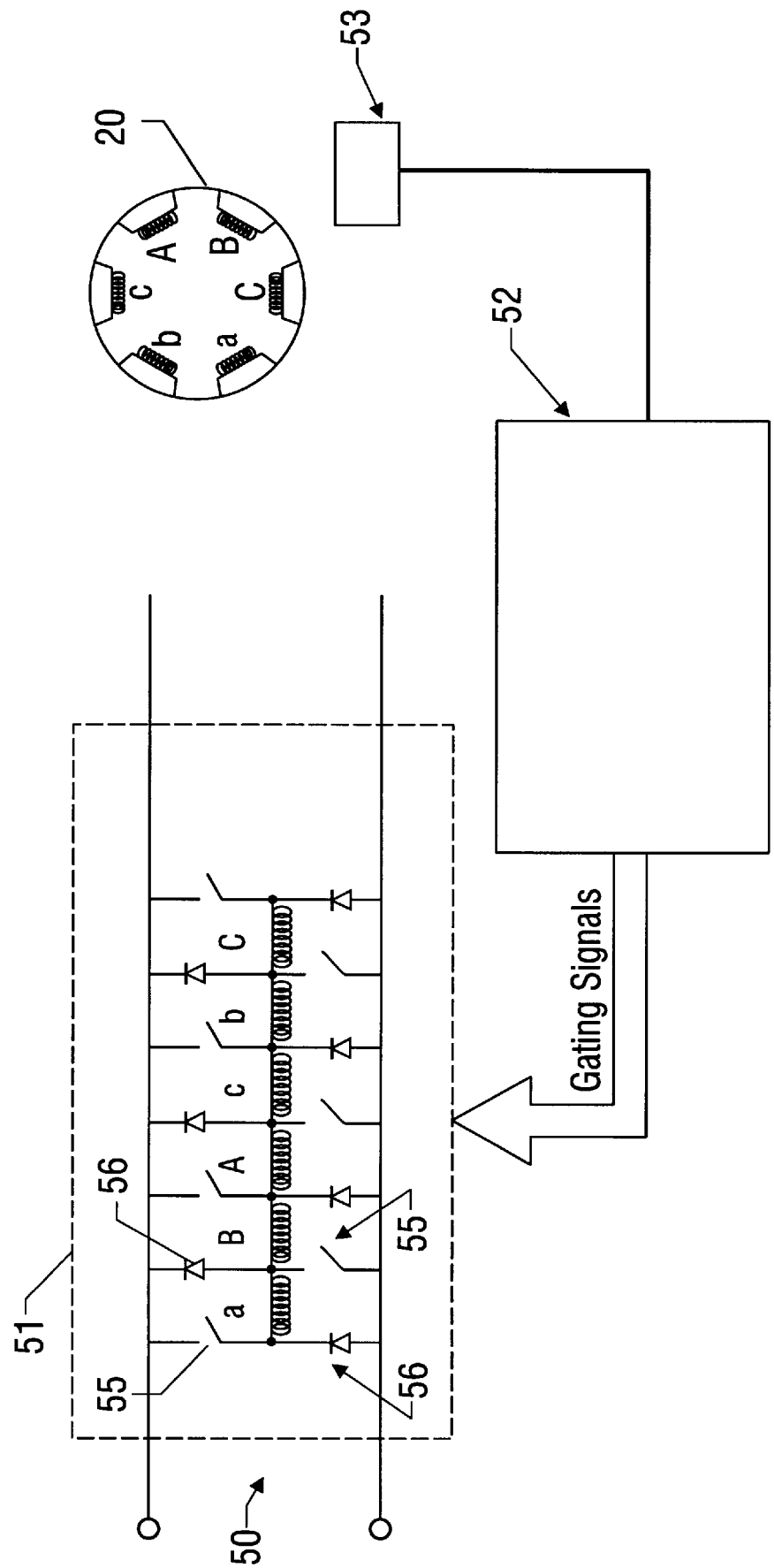
FIG. 5 illustrates a reluctance machine system for implementing the energization scheme of FIG. 4.

FIG. 5 illustrates an exemplary system for energizing the machine 20 according to the energization scheme of FIG. 4. Referring to FIG. 5, the system includes a source of DC power 50, a power inverter 51 coupled to receive the DC power, a controller 52 coupled to provide actuation signals to the gates of power switching devices in the power inverter 51 and a reluctance machine 20 whose phase windings a, b, and c and A, B and C are coupled and adapted for energization by the power inverter 51. A rotor position transducer 53 provides information to the controller 52.

The source of DC power is illustrated as comprising a DC bus having positive and negative buses. The positive and negative DC buses may be provided by any suitable source of DC power including a battery, an AC-DC converter, or the like.

The power inverter 51 receives the DC power and delivers the power to the respective phase windings in response to switching signals provided by the controller 53. Power inverter 51 may be constructed in a conventional fashion and may include a half-bridge switching arrangement, a full-bridge switching arrangement or any other type of switching arrangement that is cable of providing the motor the excitation currents illustrated in FIG. 4. In the illustrated embodiment of FIG. 5, power inverter 51 comprises a six-phase half-bridge switching arrangement where six legs, each comprising a power switching device 55 and a diode 56, are coupled across a DC bus. The phase windings are then coupled across the junctions of the switching devices 55 and the diodes 56. As those of ordinary skill in the art having the benefit of this disclosure will appreciate, actuation of the various power switching devices 55 into a conducting state will result in the application of electric power to the various phase windings.

The switching signals that are applied to the power switching devices 55 are generated by the controller 53. In the embodiment of FIG. 5, the controller 52 generates the switching signals in response to rotor position information is provided by rotor position transducer 53 which may comprise Hall effect sensors, reluctance sensors, optical sensors, capacitive sensors, or any other suitable structure for detecting the angular position of the rotor. The controller 52 may include circuitry for controlling the average magnitude of the phase energization currents (e.g., through pulse width modulation, bang-bang current control or the like) to control the magnitude of the reluctance torque output or the rotational speed of machine 20.

In operation, the controller 52 receives rotor position information from rotor position transducer 53 and provides the appropriate switching signals to the power inverter 51 to establish the phase energization currents illustrated in FIG. 4. These currents, in turn, provide the total reluctance torque output illustrated in FIG. 4.

The energization scheme illustrated in FIG. 4, while providing for an improved performance machine, produces torque only as a function of the self-inductance of each of the phase windings a, b and c and A, B and C. The exemplary machine 20 of the present invention may also be energized to provide torque that results both from the self-inductances of the phase windings a, b and c and A, B and C and the mutual-inductances between the various phase windings. The general manner in which these self and mutual-inductance reluctance torques are established is reflected in FIGS. 6A–6D which illustrates a "un-wound" view of machine 20.

In the exemplary machine of FIGS. 6A–6D each of the rotor and stator poles spans an angle corresponding to 30 degrees mechanical, the angular distance between adjacent stator pole edges is thirty angular degrees and the angular distance between adjacent rotor pole edges is sixty degrees mechanical. Those of ordinary skill in the art will appreciate that this is an exemplary arrangement only and that other rotor pole and stator pole spans, and other angular distances between adjacent pole edges may be used without departing from the present invention.

Figure 6A:
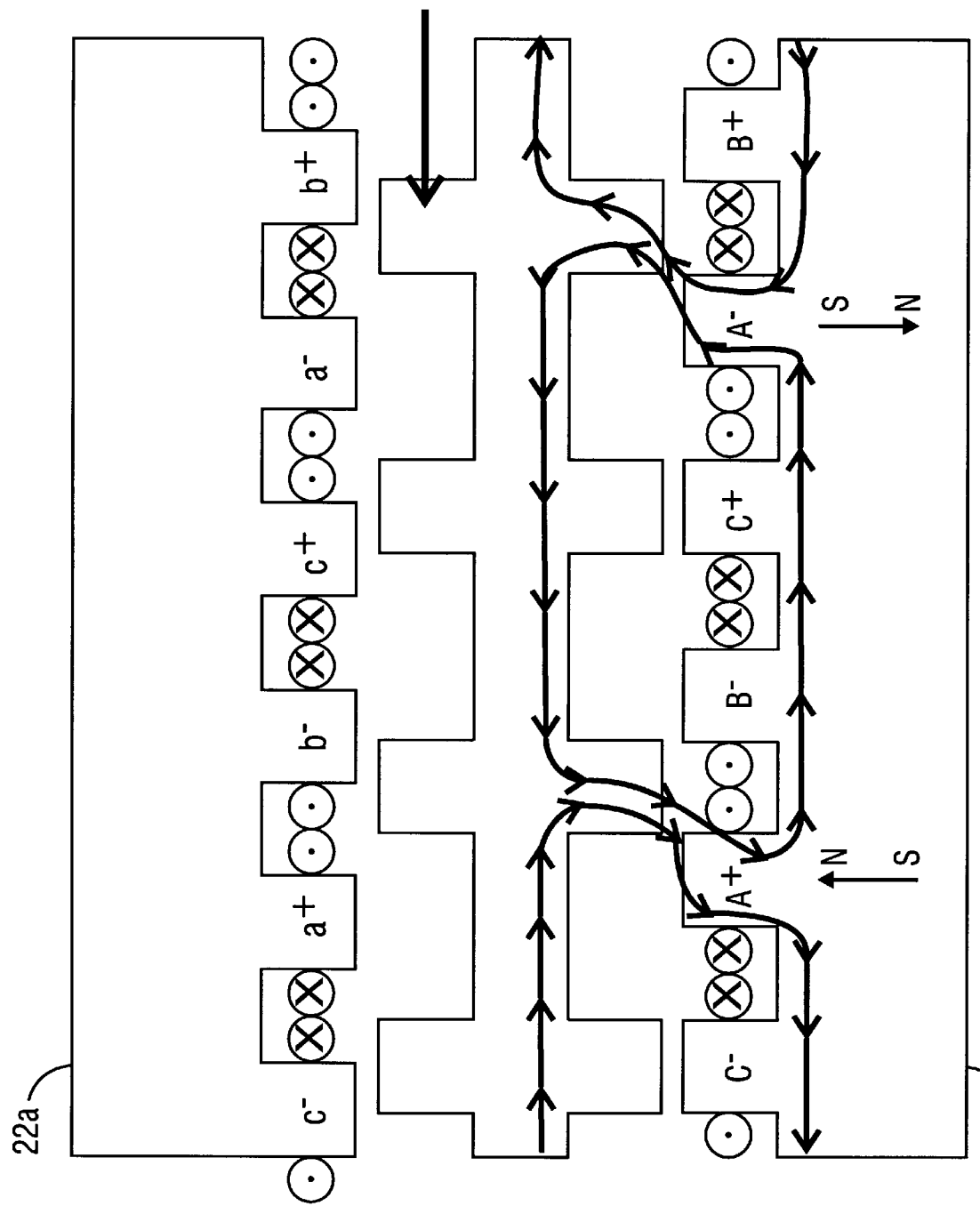
FIGS. 6A–6D illustrate the manner in which the reluctance machine of FIGS. 2A and 2B may be energized to establish self inductance torque and mutual inductance torque.

Turning to FIG. 6A–6D, each of the stator poles of the first and second stators 22a and 22b are illustrated as are each of the rotor poles for an exemplary rotor position. In addition to illustrating the manner in which the machine 20 may be energized to produce self and mutual inductance torque FIGS. 6A–6D also illustrates the relationship between the rotor pole pitch and the stator pole pitch. FIGS. 6A–6D also illustrate in greater detail how the coils that comprise the phase windings may be placed around the stator poles. Specifically, FIGS. 6A–6D illustrate the placement of the coils for phase windings a and A using the "dot and cross" convention where the dot indicates that positive current flows out of the page and the cross indicates that positive current flows into the page. The quarter pole pitch THETA is illustrated in FIG. 6A as is the slight overlap between opposing stator poles of the first and second stator portions.

FIG. 6A generally illustrates the magnetic makeup of the machine 20 when only one of the phase windings, phase A, is energized with positive current when the rotor is at the exemplary position reflected in the figure. This energization establishes a inward north magnetic pole N in the vicinity of one of the stator poles around which phase A is wound and an inward south magnetic pole S in the vicinity of the other stator pole around which phase A is wound. These magnetic poles will tend to establish a flux path, identified by the dashed-arrowed lines in FIG. 6A, which flows from the inward north pole N through the rotor, through the inward south pole S and, through the stator yoke, back to the inward north pole N. This flux path will tend to cause the rotor to rotate to a position where the rotor poles are in direct alignment with the inward north and south poles N and S and will tend to cause the rotor to rotate in the direction of the arrow illustrated in FIG. 6A which is towards the left in the exemplary example.

As the flux paths in FIG. 6A indicate, after passing through a rotor pole and/or a stator pole, the flux will "separate" such that approximately half the flux traverses the rotor/stator yoke in one direction and the other half traverses the rotor/stator yoke in the other direction. Because of these parallel flux paths, the flux flowing through the stator and rotor yokes is approximately equal to one-half of the total flux flowing through the rotor and stator poles. As such, the flux density in the rotor and stator yokes may be maintained at reasonable levels and, for a given rotor pole/stator pole flux density, a smaller yoke can be used that would be required in a conventional reluctance machine. This "flux-splitting" aspect of the present invention is common to all of the situations discussed in FIGS. 6A–6D.

Figure 6B:
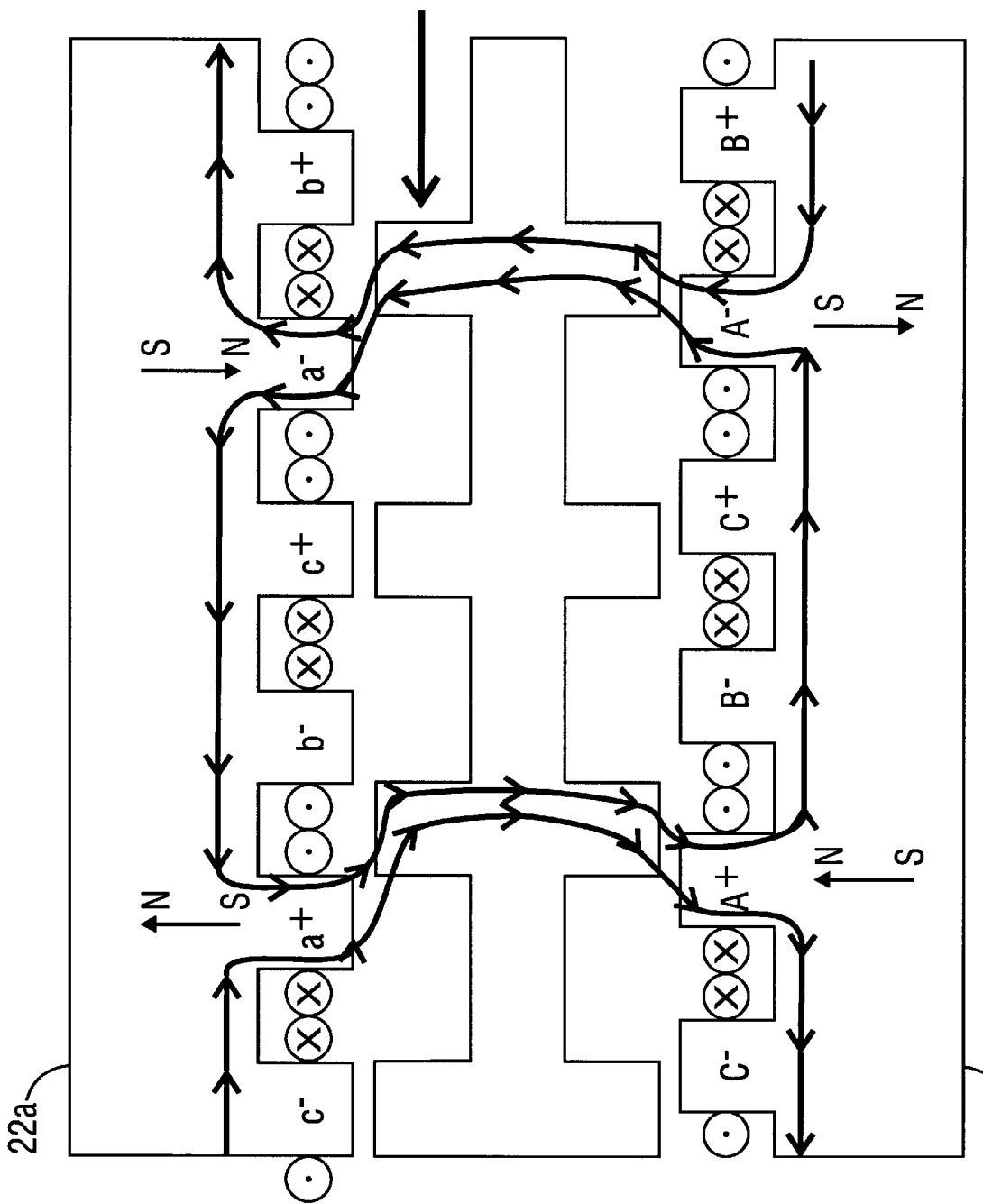

As the rotor rotates to the left, the rotor will reach a position where a portion of a given rotor pole overlaps the stator poles associated with phase winding A and a portion of the stator poles associated with the phase winding a. FIG. 6B illustrates the rotor at such an exemplary position. At this point, if both phases A and a are energized, positive torque can be created because of the mutual inductances between phases A and a.

FIG. 6B illustrates the magnetic makeup of machine 20 when both phase a and phase A are energized. The flux paths previously discussed in connection with the individual energization of phase A as not reflected in FIG. 6B, although it will be understood that such flux paths exist and that self-inductance torque resulting from the energization of phase A will continue to be generated and that self-inductance torque will similarly be generated as a result of the energization of phase a.

As reflected in FIG. 6B, when both phases a and A are energized, the opposing unaligned stator poles from the two stators 22a and 22b have inward pointing electromagnets of opposite polarities. This tends to establish a flux path that flows from one of the energized stator poles on stator 22a, through the rotor, through one of the energized stator poles of stator 22b, through the yoke of stator 22b, and then back to the initial stator pole through a corresponding return path. This flux flow, resulting from the mutual inductances between phase a and phase A, results from the un-aligned nature of the two stators 22a and 22b. This flux flow tends to move the rotor in the direction indicated by the arrow in FIG. 6B (to the left). As may be noted this "mutual-inductance" torque is in the same direction as the "self-inductance" torque illustrated in FIGS. 6A.

As the rotor continues to move to the left, the rotor will reach a position where the rotor poles of the rotor are completely aligned with the stator poles associated with phase A. At this point, further energization of phase A will not produce positive torque at may produce negative torque. If, at this rotor position, the phase A winding is de-energized and the phase a winding energized (or allowed to remain energized) positive torque will be established by the self-inductance of the phase a winding. This is reflected in FIG. 6C.

Figure 6C:
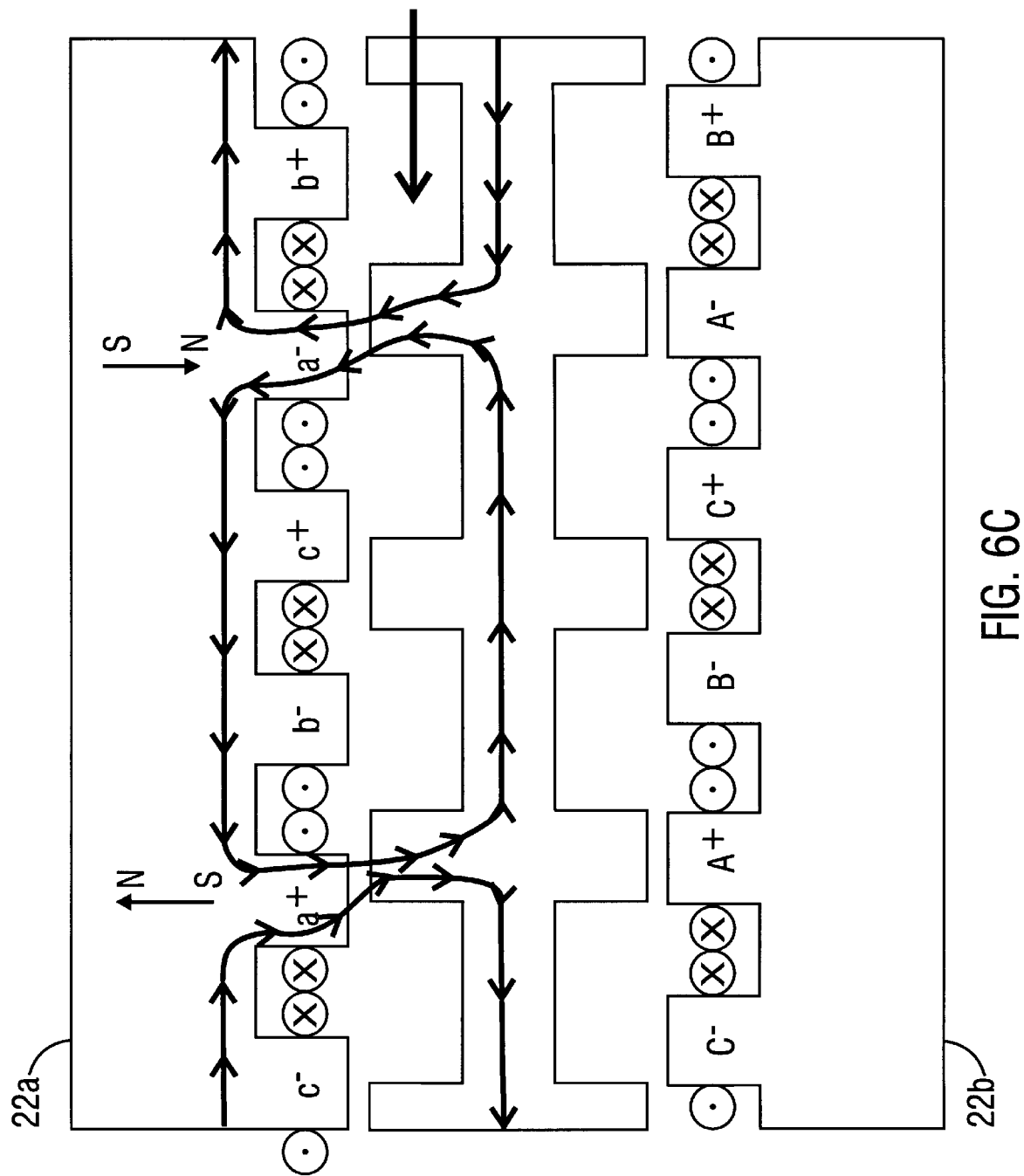
Figure 6D:
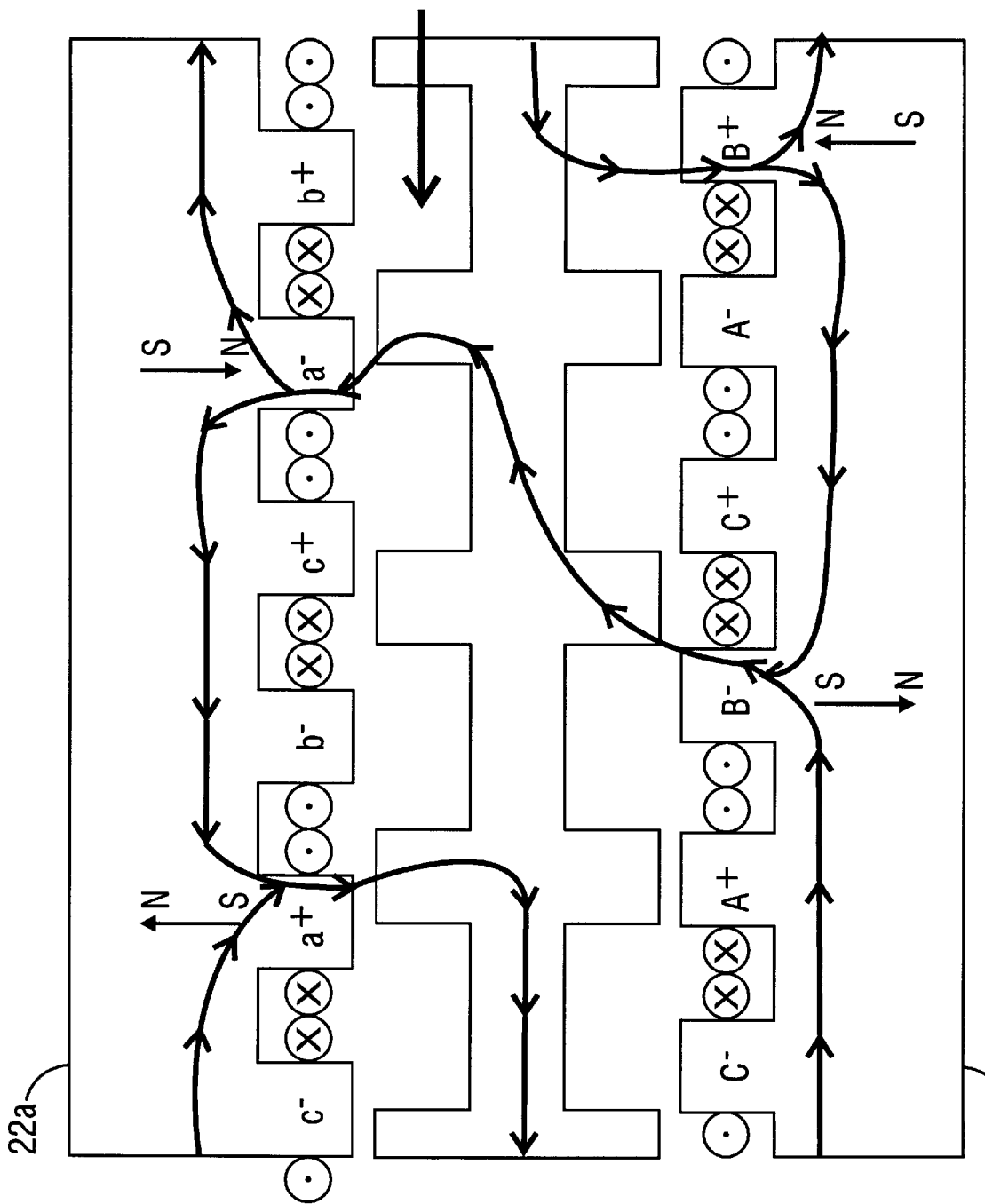

FIG. 6D illustrates machine 20 with the rotor in the same position as in FIG. 6C. For purposes of this figure, however, it is assumed that both phase windings a and B are energized. As illustrated in the figures, this simultaneous energization of phases a and B at this rotor position produces positive output torque as a result of the mutual-inductances between phases a and B. Moreover, although not illustrated in FIG. 6D, there are positive torque contributions when the rotor is at the position illustrated in FIG. 6D from the self-inductances of both phases a and B.

As FIGS. 6B–6D indicate, over the entire energization interval for phase a, there is a positive torque contribution resulting from: (i) the self-inductance of phase a and (ii) the mutual inductance between phase a and another phase (phase A for FIG. 6B and phase C for FIG. 6D). This ability to produce positive output torque that results from both self- and mutual-inductances is one characteristic of one aspect of the present invention. This characteristic is true for all of the phases of the exemplary machine 20.

From the foregoing it may be noted that the axial flux machine of FIGS. 2A and 2B may be energized so as to provide both mutual-inductance torque and self-inductance torque.

Figure 7:
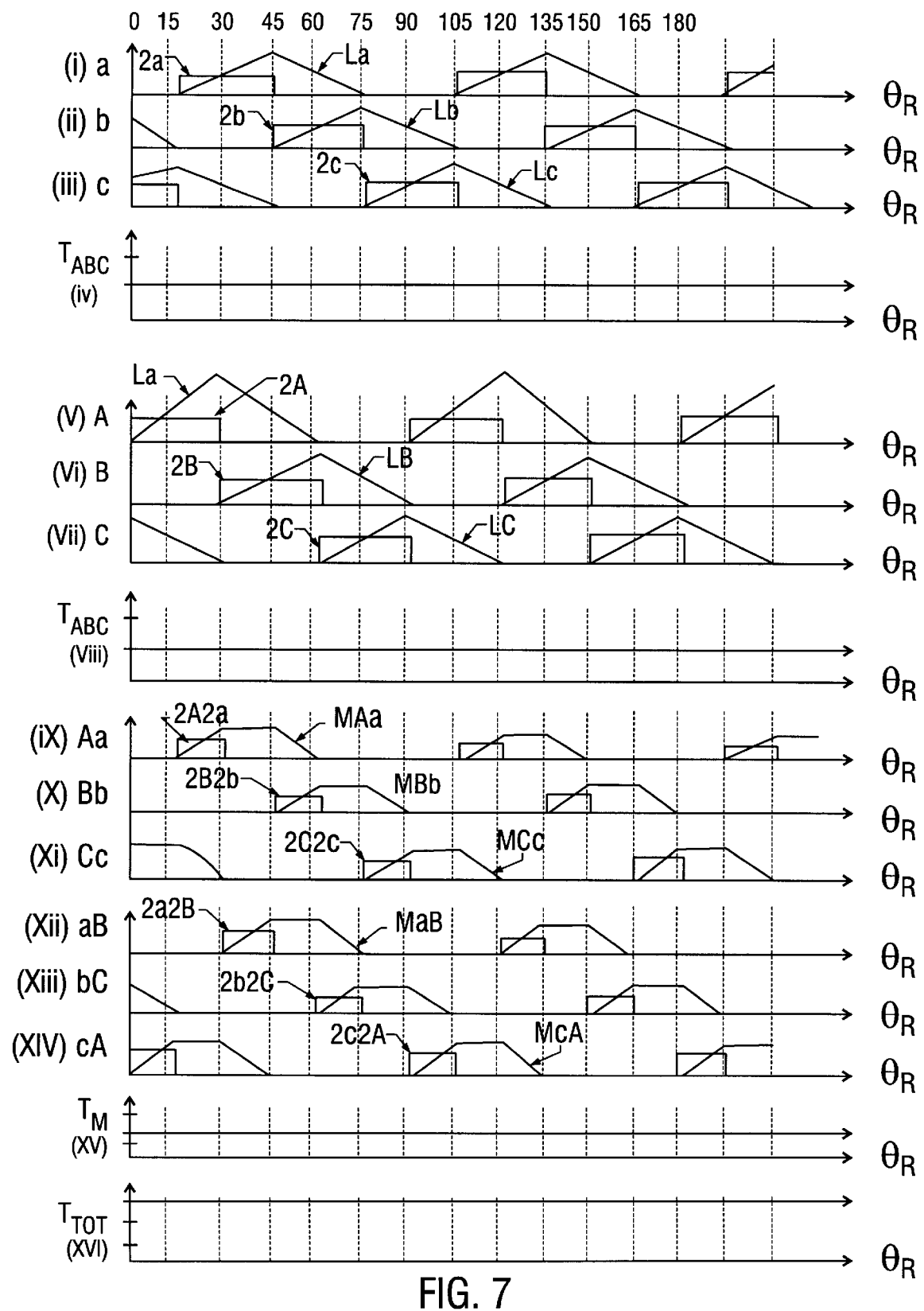
FIG. 7 illustrates an energizing scheme for the machine of FIGS. 2A and 2B where both self inductance torque and mutual inductance torque are produced.

FIG. 7 illustrates one exemplary energization scheme for the machine 20 of FIGS. 2A and 2B which provides an improved torque output that has relatively low torque ripple. From top to bottom FIG. 7 illustrates: (i)–(iii) the inductance and phase current waveforms for phases a, b and c; (iv) the reluctance torque output from phases a, b and c; (vi)–(vii) the inductance and phase current waveforms for phases A, B and C; (viii) the reluctance torque output from phases A, B and C; (ix)–(xi) the mutual inductance waveforms for phases aA, bB and cC and an indication of the periods of current overlap between the identified phases; (xii–xiv) the mutual inductances between the various different phases aB, bC and CA and an indication of the current overlap between the identified phases; (xv) the resultant reluctance torque from the mutual inductances between the two phase windings; and (xvi) the total torque output of the machine.

As reflected in waveform (xvi) of FIG. 7, the total torque output for machine 20 when energized according to the energization scheme of FIG. 7 has relatively high torque and relatively low torque ripple. This "smooth" output both reduces unwanted vibration and noise and provides a cleaner driving force to the shaft of the reluctance machine. The smoothness of the output torque results from the fact that the total output torque is a result of both self and mutual-inductance.

As the forgoing indicates when machine 20 is energized according to the energization scheme of FIG. 7, the net output reluctance torque produced when the phase windings are energized as the rotor rotates through a given interval of rotation includes a positive torque contribution arising from the variations in the self-inductances of the energized phase windings as the rotor rotates through given interval and a positive torque contribution arising from the variations in the mutual-inductance between the energized phase windings as the rotor rotates through the given interval.

In the present invention, the arrangement of the rotor and the two stator ensures that self inductance and mutual inductance torques can exist and provides for an improved-performance axial flux reluctance machine.

Figure 8:
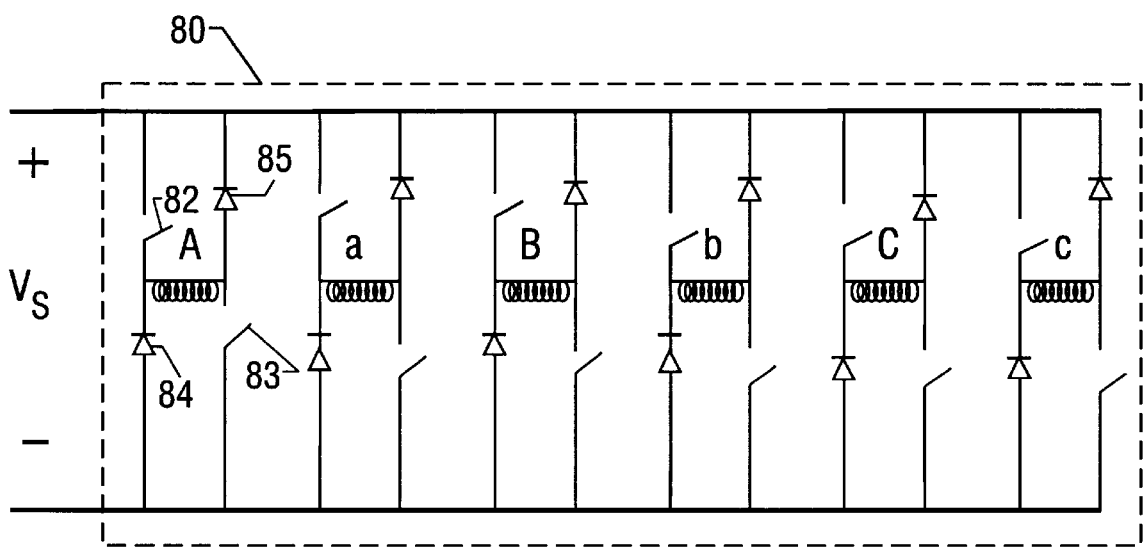
FIG. 8 illustrates a power inverter for use with the reluctance system illustrated in FIG. 5 to implement the energization scheme of FIG. 7.

Circuitry similar to that illustrated in FIG. 5 may be used to implement the energization scheme of FIG. 7. However, since current must be established in two phase windings simultaneously, the power inverter 51 of FIG. 5 cannot be used. FIG. 8 illustrates an alternate inverter 80 that can be used with the circuitry of FIG. 5—with slight modification that will be apparent to one of ordinary skill in the art having the benefit of this disclosure—to implement the energization scheme of FIG. 7.

In general, power inverter 80 comprises a power inverter having twelve individual power legs where each power leg includes a power switching device coupled in series with a diode. Referring to the exemplary switching arrangement associated with phase winding a (the switching arrangements for the other phases are substantially the same) an upper power switching device 82 couples one of the rails of a DC bus to the phase winding and a lower poser switching device 83 couples the other end of the phase winding to the negative rail of the DC bus. Flyback diodes 84 and 85 are appropriately provided to allow for current circulation in the event that one or both of the power switching devices are rendered non-conductive which current is still flowing through the phase windings. The precise switching signals that must be applied to power inverter 80 to implement the energization scheme of FIG. 7 will be apparent to one of ordinary skill in the art having the benefit of this disclosure. The power inverter 81 is only exemplary of the type that may be used to implement the energization scheme of FIG. 7 and any other suitable power inverter capable of simultaneously energizing two phase windings may be used.

The above description of several exemplary embodiments is made by way of example and not for purposes of limitation. Many variations may be made to the embodiments and methods disclosed herein without departing from the scope and spirit of the present invention. For example, the present invention was discussed in the context of a six stator pole, four rotor pole machine. Alternate stator pole/rotor pole combinations (e.g., 12/8, 8/4) are envisioned, and the use of such alternate configurations will not depart from the scope of the present invention. The present invention is intended to be limited only by the scope and spirit of the following claims.

What is claimed is:

1. An axial flux reluctance machine system comprising:
   (i) an axial flux reluctance machine comprising:
      a rotor arranged to rotate about a central axis, the rotor comprising a central yoke, a first set of rotor poles extending in a first direction that is essentially parallel to the axis of rotation and a second set of rotor poles extending in a second direction that is opposite that of the first direction,
      a first stator positioned adjacent to the rotor, the first stator defining a number of projecting stator poles that extend in the second direction, the first stator being positioned such that the first stator's projecting stator poles are opposite the first set of rotor poles, a first phase winding being wound about at least two non-adjacent poles of the first stator; and
      a second stator positioned adjacent to the rotor, the second stator defining a number of projecting stator poles that extend in the first direction, the second stator being positioned such that the second stator's projecting stator poles are opposite the second set of rotor poles, a second phase winding being wound about at least two non-adjacent poles of the second stator;
      wherein the first stator's stator poles are not completely aligned with the second stator's stator poles;land
   (ii) a controller for: (a) energizing the first phase winding, but not the second phase winding, over a first interval of rotor rotation: (b) simultaneously energizing both the first and the second phase windings during a second interval over a second interval of rotor rotation; and (c) energizing the second phase winding, but not the first phase winding, over a third interval of rotor rotation.

2. The axial flux reluctance machine system of claim 1 wherein common points on the stator poles of the first stator are separated by a given stator pole pitch and wherein the first stator's stator poles are offset from the second stator's stator poles by an amount equal to approximately one-quarter of the stator pole pitch.

3. The axial flux reluctance machine system of claim 1 wherein the first and second stators each define six stator poles, wherein the first and second sets of rotor poles each define four rotor poles and wherein the stator pole pitch is sixty mechanical degrees.

4. The axial flux reluctance machine system of claim 1 wherein the rotor is formed from a wound tape of paramagnetic material.

5. The axial flux reluctance machine system of claim 1 wherein the first stator is formed from a wound tape of paramagnetic material.

6. The axial flux reluctance machine system of claim 1 wherein the first stator's stator poles are regularly placed about the first stator such that the angular distance between each pair of adjacent stator poles is approximately the same.

7. The axial flux reluctance machine system of claim 1 wherein the rotor poles are regularly placed about the rotor such that the angular distance between each pair of adjacent rotor poles is approximately the same.

8. A reluctance machine system comprising:
   a rotor arranged to rotate about a central axis, the rotor comprising a central yoke, a first set of rotor poles extending in a first direction that is essentially parallel to the axis of rotation and a second set of rotor poles extending in a second direction that is opposite that of the first direction,
   a first stator positioned adjacent to the rotor, the first stator defining a number of projecting stator poles that extend in the second direction, the first stator being positioned such that the first stator's projecting stator poles are generally opposite the first set of rotor poles;
   a first set of phase windings wound around the first stator's stator poles;
   a second stator positioned adjacent to the rotor, the second stator defining a number of projecting stator poles that extend in the first direction, the second stator being positioned such that the second stator's projecting stator poles are generally opposite the second set of rotor poles;
   a second set of phase windings wound around the second stator's stator poles;
   wherein the first stator's stator poles are not completely aligned with the second stator's stator poles; and
   a power inverter having outputs coupled to the first and second sets of phase windings of the reluctance machine, the power inverter adapted to provide phase energization currents to the first and second sets of phase windings to produce a net positive reluctance torque output by: (i) energizing a phase winding from the first set of phase windings, but no winding from the second set of phase windings, over a first interval of rotor rotation; (b) simultaneously energizing a phase winding from both the first and the second sets of phase windings over a second interval of rotor rotation; and (c) energizing a phase winding from the second set of phase windings, but no winding from the first set of phase windings, over a third interval of rotor rotation.

9. The reluctance machine system of claim 8 wherein the number of projecting stator poles defined by the first stator is the same as the number of projecting stator poles defined by the second stator.

10. The reluctance machine system of claim 9 wherein the first stator defines six stator poles and the rotor defines four rotor poles.

11. The reluctance machine system of claim 8 wherein the stator poles defined by the first stator are separated by a given angular stator pole pitch and wherein the first and second stators are arranged such that the stator poles defined by the first stator are offset from the stator poles defined by the second stator by approximately one-quarter of the stator pole pitch.

12. An axial flux reluctance machine system comprising:
    (i) an axial flux reluctance machine comprising:
        a rotor adapted to rotate about an axis of rotation, the rotor having a rotor yoke and a plurality of projecting rotor poles that extend from the rotor yoke in a direction that is essentially parallel to the axis of rotation of the rotor, the rotor yoke extending in a direction essentially perpendicular to the axis of rotation of the rotor;
        a first stator portion adjacent the rotor, the first stator portion including a first stator yoke and a number of projecting stator poles that extend from the first stator yoke in a direction that is essentially parallel to the axis of rotation of the rotor and a first phase winding wound about the stator poles of the first stator portion; and
        a second stator portion adjacent the rotor, the second stator portion including a second stator yoke and a number of projecting stator poles that extend from the second stator yoke in a direction that is essentially parallel to the axis of rotation of the rotor and a second phase winding wound about the stator poles of the second stator portion; and
    (ii) a controller for: (a) energizing the first phase winding, but not the second phase winding, over a first interval of rotor rotation; (b) simultaneously energizing both the first and the second phase windings during a second interval over a second interval of rotor rotation; and (c) energizing the second phase winding, but not the first phase winding, over a third interval of rotor rotation;
    wherein the net output reluctance torque produced when the first and second phase windings are simultaneously energized as the rotor rotates through the second interval of rotation includes a positive torque contribution arising from the variations in the self-inductances of the first and second phase windings as the rotor rotates through the second interval and a positive torque contribution arising from the variations in the mutual-inductance between the first and second phase windings as the rotor rotates through the second interval;
    where the peak flux density in the rotor poles is greater than the peak flux density in the rotor yoke; and
    wherein the first and second stator portions are positioned with respect to the rotor such that the peak flux density in the first stator portion's stator poles is greater than the peak flux density in the first stator yoke and wherein the peak flux density in the second stator portion's stator poles is greater than the peak flux density in the second stator yoke.

13. An axial flux reluctance machine system comprising:
    a rotor adapted to rotate about an axis of rotation having a rotor yoke and a plurality of projecting rotor poles that extend from the rotor yoke in a direction that is essentially parallel to the axis of rotation of the rotor the rotor yoke extending in a direction essentially perpendicular to the axis of rotation of the rotor;
    a first stator portion adjacent the rotor, the first stator portion including a first stator yoke and a number of projecting stator poles that extend from the first stator yoke in a direction that is essentially parallel to the axis of rotation of the rotor and a first phase winding wound about the stator poles of the first stator portion; and
    a second stator portion adjacent the rotor, the second stator portion including a second stator yoke and a number of projecting stator poles that extend from the second stator yoke in a direction that is essentially parallel to the axis of rotation of the rotor and a second phase winding wound about the stator poles of the second stator portion; and
    a power inverter having outputs coupled to the first and second of phase windings, the power inverter adapted to provide phase energization currents to the first and second phase windings to produce a net positive reluctance torque output by:
        (i) energizing the first phase winding, but not the second phase winding, over a first interval of rotor rotation, wherein the net output reluctance torque produced when the first phase winding is energized as the rotor rotates through the first interval of rotation results from the variations in the self-inductance of the first phase winding;
        (ii) simultaneously energizing both the first and the second phase windings over a second interval of rotor rotation; wherein the net output reluctance torque produced when the first and second phase windings are simultaneously energized as the rotor rotates through the second interval of rotation includes a positive torque contribution arising from the variations in the mutual-inductance between the first and second phase windings as the rotor rotates through the second interval; and
        (iii) energizing the second phase winding, but not the first phase winding, over a third interval of rotor rotation, wherein the net output reluctance torque produced when the second phase winding is energized as the rotor rotates through the third interval of rotation results from the variations in the self-inductance of the second phase winding;
    where the peak flux density in the rotor poles is greater than the peak flux density in the rotor yoke; and
    wherein the first and second stator portions are positioned with respect to the rotor such that the peak flux density in the first stator portion's stator poles is greater than the peak flux density in the first stator yoke and wherein the peak flux density in the second stator portion's stator poles is greater than the peak flux density in the second stator yoke.

* * * * *